United States Patent [19]

Forrester

[11] 4,019,938
[45] Apr. 26, 1977

[54] APPARATUS AND PROCESS FOR MANUFACTURING INSULATION BOARD

[75] Inventor: Harry Forrester, Newton, N.J.

[73] Assignee: United States Mineral Products Company, Stanhope, N.J.

[22] Filed: Jan. 14, 1976

[21] Appl. No.: 649,088

[52] U.S. Cl. .............................. 156/78; 156/228; 156/285; 156/300; 156/304; 156/552; 156/556; 198/624; 271/196; 264/45.1; 264/46.3; 264/321

[51] Int. Cl.² ....................................... B32B 5/20

[58] Field of Search ............ 156/79, 300, 285, 302, 156/304, 228, 552, 556; 264/45.1, 46.3, 321; 198/127 R; 271/196, 194

[56] References Cited

UNITED STATES PATENTS

| | | | |
|---|---|---|---|
| 3,159,514 | 12/1964 | McKnight et al. | 264/46.3 |
| 3,167,603 | 1/1965 | Lillie | 264/46.2 |
| 3,170,827 | 2/1965 | Voelker | 156/78 |
| 3,848,752 | 11/1974 | Branch et al. | 271/196 |

Primary Examiner—Edward G. Whitby
Attorney, Agent, or Firm—Philip Rodman

[57] ABSTRACT

Insulation board comprising a urethane foam core sandwiched between a thin flexible membrane and a thicker inflexible panel is made by dispensing foam forming materials onto a moving continuous sheet of the thin flexible membrane and depositing individual panel segments onto the foam as it expands. The manufacturing apparatus includes a conveyor press for transporting the flexible membrane past a foam dispensing device and means for consecutively depositing the individual panel segments onto the expanding foam. The panel depositing means comprise a suction apparatus for suspending the panel over the foam and a friction drive mechanism for simultaneously impelling a leading end of the panel against a trailing end of an immediately preceding panel to prevent the formation of gaps between consecutive panel segments. The resultant laminate is then passed through the conveyor press that acts as a forming and curing zone for the laminate which is thereafter cut to size at a cutting station.

19 Claims, 7 Drawing Figures

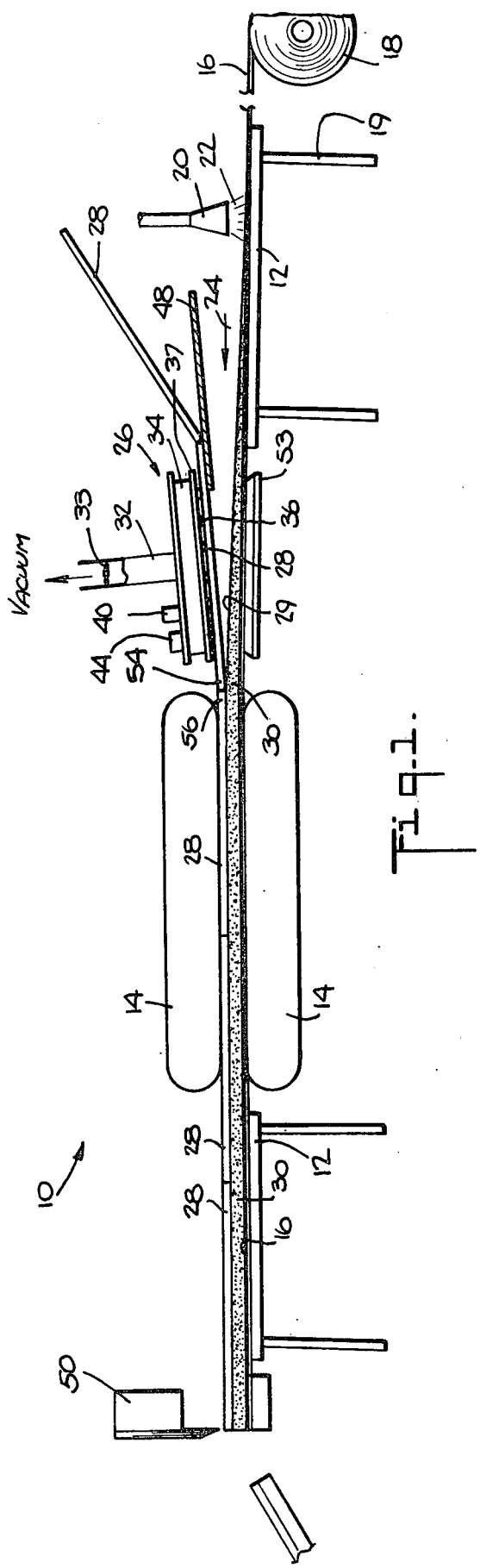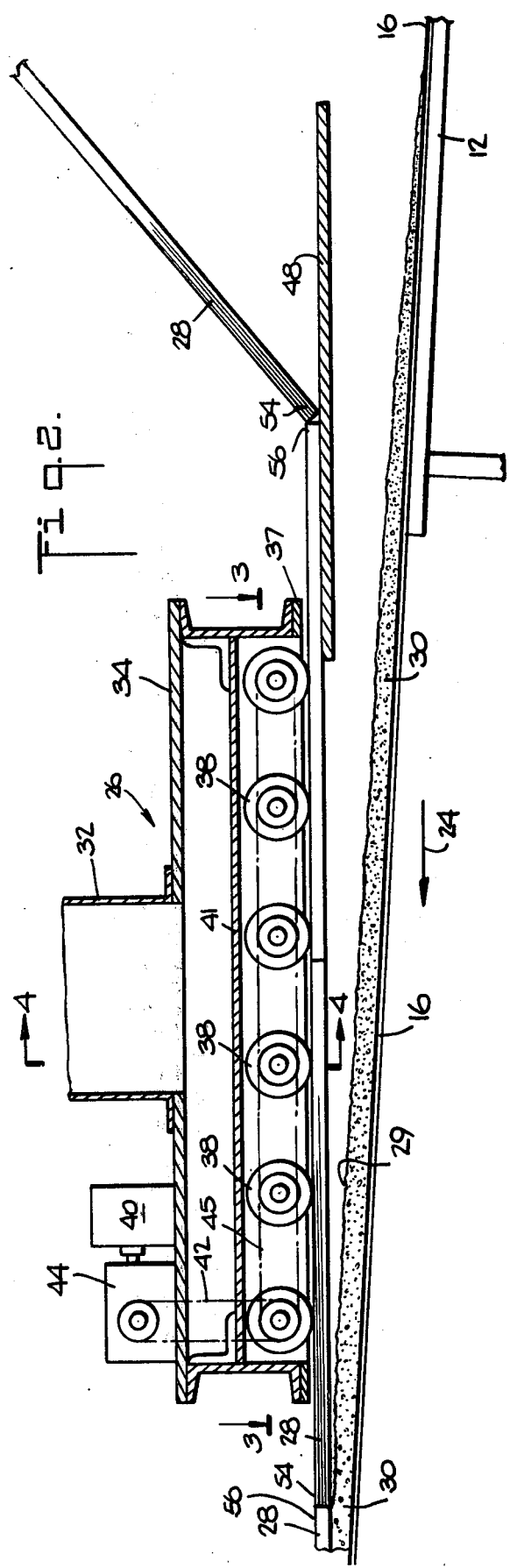

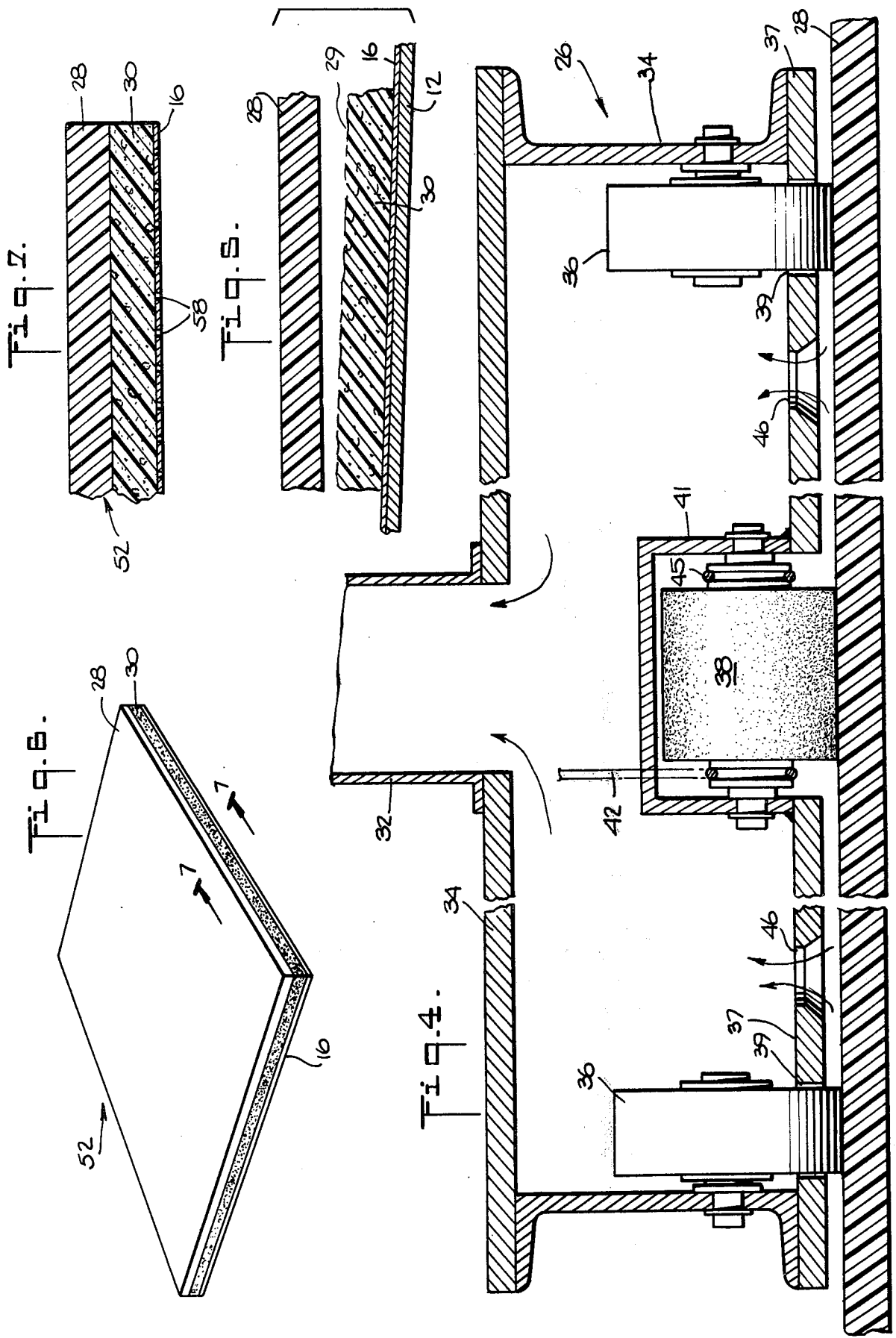

APPARATUS AND PROCESS FOR MANUFACTURING INSULATION BOARD

This invention relates to insulation boards for roofing, flooring and walls, and more particularly to an improved apparatus and process for making such insulation boards.

The provision of insulation materials on roofs, and in floor and wall spaces is a common practice especially in structures such as warehouses, office buildings, manufacturing facilities, cold storage plants and high traffic public buildings where energy savings have a considerable effect on the overall operating expense of such structures. Insulation material in the form of a board or panel has been found especially convenient to use on roofs and in floor and wall spaces because it can be easily and quickly installed, and provides substantially uniform coverage.

One type of insulation board generally used on roofs is a laminate comprising a urethane foam core sandwiched between a thin flexible sheet and a thicker inflexible panel. In a known method for manufacturing such insulation boards a plurality of the thick inflexible panels are disposed in successive order on a movable support member such as a conveyor. A layer of foam forming materials is then continuously dispensed onto the thick panels which form a base for the laminate, while the panels move past a device for dispensing the foam forming materials. The thin flexible sheet, which is usually fed from a supply roll, is laid over the expanding foam forming materials thereby completing the structure of the laminate. Generally the laminate is passed through a conveyor press to ensure uniform thickness of the resultant product.

One of the problems inherent in this process is that the foam, as it expands, often contains some surface irregularities such as peaks and depressions that may be apparent in the surface of the thin flexible sheet after the lamination process has been completed. A further disadvantage of this process is that the thick inflexible panels, which receive the foam forming materials, tend to conduct heat away from the expanding foam causing excessive densification of the foam structure adjacent the flexible panel. Another disadvantage of this process is that the foam forming materials have a tendency to leak onto the conveyor and/or conveyor press through space between the consecutive inflexible panels. A protective paper is thus required on the conveyor to prevent such foam contamination.

In another known process for manufacturing insulation boards of the type described, the thick inflexible panels are again disposed in successive order on a movable support member to form a base for the laminate. However, the sheet of flexible material is dispensed from an overhead supply roll for receipt of the foam forming chemicals. The foam and flexible membrane are then inverted so that the foam surface contacts the row of moving inflexible panels. This apparatus is more intricate and considerably more expensive than the previously described apparatus.

It is thus desirable to provide an improved inexpensive apparatus and process for making insulation board of the type described wherein a thin flexible membrane after lamination to a foam core is substantially devoid of surface imperfections, wherein foam densification in the laminate is substantially eliminated and wherein foam contamination of the conveyor due to foam leakage between the inflexible panels is substantially eliminated.

Among the several objects of the present invention may be noted the provision of a novel apparatus for making insulation board of the type described; a novel apparatus for making insulation board of the type described wherein relatively thick inflexible panels are disposed in consecutive order onto foam forming materials that are supported by a movable layer of thin flexible material; an apparatus for making insulation board of the type described wherein relatively thick inflexible panels are impelled one against the other in successive fashion to avoid the formation of gaps between the panels as they are consecutively deposited onto a layer of foam forming materials; and, a novel method for making insulation board. Other objects and features will be in part apparent and in part pointed out hereinafter.

The present invention relates to an apparatus and process for manufacturing insulation board in laminate form. The apparatus, in a preferred embodiment, includes transport means such as a conveyor press for moving a sheet of relatively thin flexible material, a device for dispensing foam forming chemicals onto the moving flexible sheet and a panel depositing device for successively depositing relatively thick inflexible panels onto the foam forming materials. The panel depositing device employs suction and a drive surface with a high coefficient of friction to simultaneously suspend and drive each panel onto the expanding foam.

When the apparatus is in operation, a supply roll of the thin flexible material is unwound and fed into the conveyor press for movement past the chemical dispensing device to receive foam forming chemicals that are sprayed thereon in layer form. The panel depositing device suspends each panel at an inclined attitude with respect to the foam layer such that a leading end of an undeposited panel is impelled by the drive surface against a trailing end of an immediately preceding panel. The drive surface of the panel depositing device is arranged to move at a linear speed in excess of the linear speed of the conveyor press to establish a back pressure between successive panels and thus prevent the formation of gaps therebetween. Each respective panel adheres to the foam as it is deposited thereon. The laminate is then passed through the conveyor press which also acts as a curing zone for the foam and is finally transported to a cutting station for trimming and sizing.

The invention accordingly comprises the constructions and methods hereinafter described, the scope of the invention being indicated in the following claims.

In the accompanying drawings, in which one of various possible embodiments of the invention is illustrated, FIG. 1 is a simplified schematic diagram of an apparatus incorporating one embodiment of the present invention;

FIG. 2 is an enlarged fragmentary sectional view of a panel depositing device included therein;

FIG. 4 is a sectional view taken on the line 4—4 of FIG. 2;

FIG. 5 is an enlarged fragmentary sectional view of a laminate prior to final bonding of a panel segment;

FIG. 6 is a perspective view of a completed laminate; and,

FIG. 7 is a sectional view taken on the line 7—7 of FIG. 6.

Corresponding reference characters indicate corresponding parts throughout the several views of the drawings.

Figure 3:
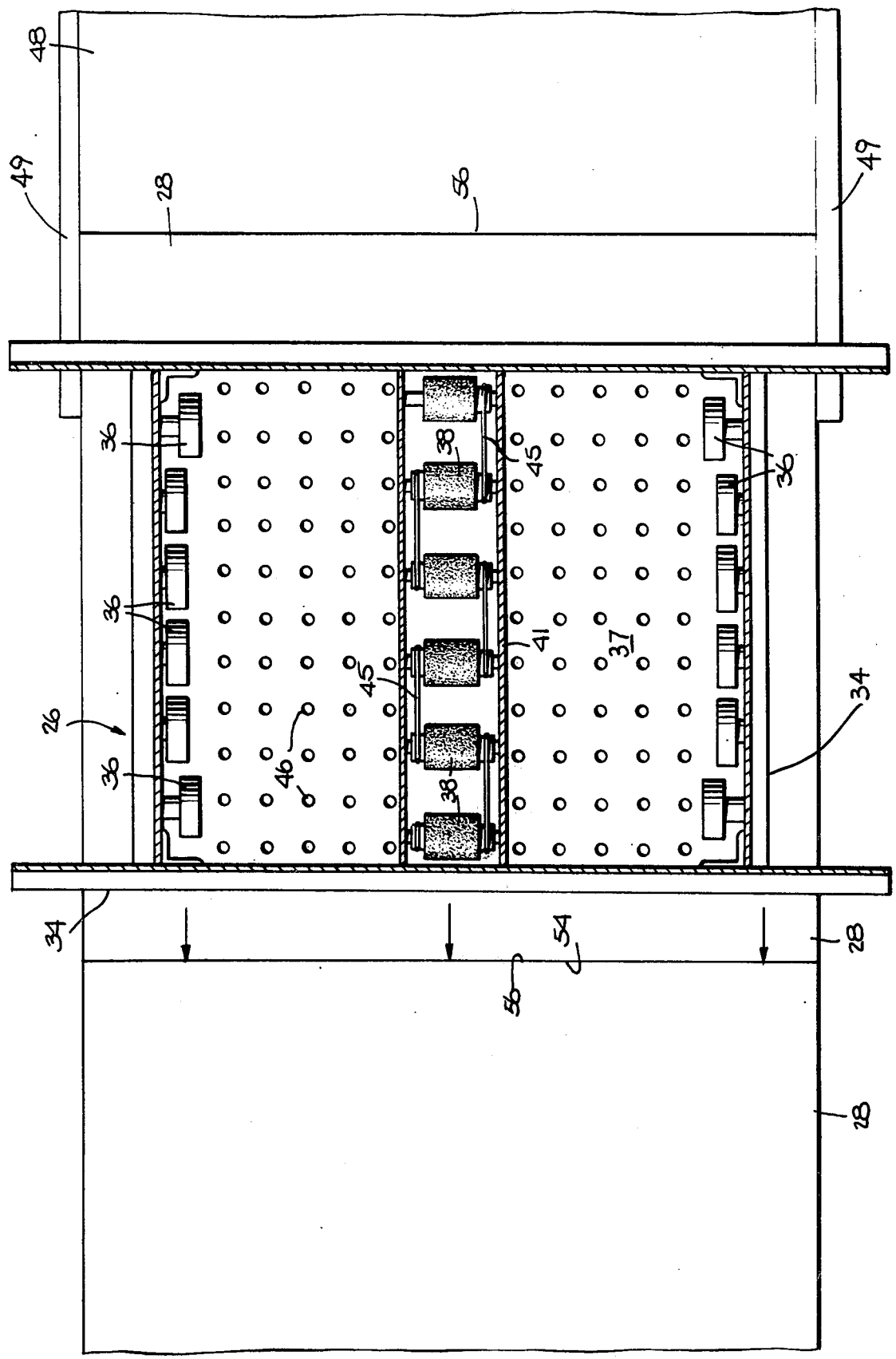
FIG. 3 is a sectional view taken on the line 3—3 of FIG. 2.

Referring now to the drawings for a detailed description of the present invention, an apparatus for manufacturing insulating board is generally indicated by reference number 10. The apparatus 10 comprises support means such as a pair of tables 12,12 disposed at the entrance and exit ends of a conveyor press 14 of known construction such as used in a Viking Continuous Laminator.

A flexible sheet 16 of asphalt saturated felt having a felt thickness of 0.033 inches and an average weight per square yard of 1.24 pounds as manufactured by Mannington Mills is provided on a supply roll 18 beyond an end 19 of the first table 12. The flexible sheet 16 is unwound onto the table 12 and fed into the conveyor press 14. A chemical dispensing device 20 of any suitable known construction and operation is provided over the flexible sheet 16 for dispensation of foam forming materials 22 in a layer onto the flexible sheet 16 as it moves over the table 12 in the direction of arrow 24. A suitable urethane foam for the purposes of this invention has the following formulation; with a resin to isocyanate ratio of 55.54/44.46:

| Ingredients | Parts by Weight | |
|---|---|---|
| Polyol (Pluracal 364-Wyandotte) | 90 | |
| Fire Retardant (Fyral CEF-Stauffer) | 5 | |
| Surfactant (LK221-Air Products) | 1 | Resin Blend |
| Amine Catalyst (Polycat 8-Abbott Labs) | 1.4 | |
| Fluorocarbon (K.11-Kaiser Chemical) | 50 | |
| Metallic Catalyst (T.12-M & T Chemicals) | 0.16 | |
| Isocyanate (Rubinate M-Rubicon) | 118 | |

The apparatus 10 further includes a panel depositing device 26 for feeding panel segments 28 onto a top surface 29 of the expanding urethane foam 30. The panel segments 28, which are relatively thick and inflexible in comparison with the sheet 16, and preferably formed of perlite such as manufactured by Grefco under the trade designation Permalite Sealskin Roof Insulation.

The panel depositing device 26, which is suspended over the table 12 in any suitable known manner, comprises an elongated duct 32 mounted to a frame 34. The frame 34 is inclined toward the table 12, in the direction of the arrow 24, by an angle of approximately 2°. A low pressure high volume axial fan 33 of known construction, such as Model No. 18 BD/DVA manufactured by the Hartzell Fan Company, is suitable supported in the duct 32 which is provided with the usual exhaust opening (not shown).

A first plurality of freely rotatable rollers 36 secured to opposite sides of the frame 34 depend approximately one-fourth inch below a base plate 37 through roller openings 39 (FIG. 4). A second plurality of rollers 38 interconnected by belts or chains 45 are mounted on an inverted channel 41 supported by the base plate 37 and also depend approximately one-fourth inch from the base plate 37. The surfaces of the rollers 38 are rubber coated, for example, to provide a relatively high coefficient of friction. A motor 40 on the frame 34 drivingly connects with the friction rollers 38 such as by means of a suitable belt or chain drive 42 and a conventional speed reducing device 44. The frame 34 is fully enclosed except for a plurality of air intake openings 46 formed in the base plate 37 and the roller openings 39. A panel feed guide 48 is disposed adjacent the frame 34 and includes opposite guide flanges 49.

In operating the apparatus 10 during manufacture of an insulation board, generally indicated by reference number 52, the conveyor press 14 is set to run at a suitable speed such as 15 feet per minute, which is also the transport speed of the flexible sheet 16 as it unwinds from the supply roll 18.

The foam forming materials 22 are sprayed or otherwise dispensed from the dispensing device 20 such as by using an air atomized mixture with air pressurized at approximately 80–115 psi. The layer of foam forming materials 22 dispersed onto the sheet 16 will vary from about 0.020 to about 0.040 inches thick and eventually expands to a thickness of foam varying from about 178 to about 3 inches with a density of about 1.5 to about 3.0 pounds per cubic foot. The resulting formation of the urethane foam 30 proceeds under the influence of exothermic heat at normal room temperatures but the reaction can be accelerated if desired using applied heat as by installing a suitable known heater 53 under the flexible sheet 16 intermediate the conveyor press 14 and the chemical dispenser 20. Although the table 12 and the heater 53 are shown side by side in FIG. 1, the table 12 can extend to the conveyor press 14 with the heater 53 disposed thereunder. The expanding urethane foam 30 adheres to the flexible sheet 16 for movement thereon in the direction of the arrow 24.

Since the thin flexible sheet 16 is of relatively small mass, only negligible amounts of heat are conducted by the sheet 16 away from the expanding foam 30. Therefore little or no densification of the foam 30 occurs adjacent the sheet 16 and the foam cell structure (not shown) adjacent to and spaced from the sheet 16 appears substantially uniform to the naked eye.

It may be noted as most clearly shown in FIG. 5 that the top surface 29 of the expanding foam is characterized by peaks and depressions that are a normal consequence of the free expansion of the foam. In certain unpredictable areas on the foam surface 29 the peaks and depressions may be more pronounced than in other areas. The existence of such peaks and depressions is not apparent in the panels 28 after they are laid onto the tacky foam surface 29 because the panels 28 are relatively inflexible in comparison with the sheet 16 and do not yield when making contact with the foam surface 29. Moreover, there is little or no densification of the foam adjacent the panel 28 because the foam expansion is nearly completed when the panel 28 is laid thereon. In making arbitrary cross-sectional cuttings of the laminate 52, it has been found that the cell structure of the foam core 30 between the panel 28 and the flexible sheet 16 is substantially uniform to the naked eye with no apparent areas of densification.

The inflexible panel segments 28 are deposited by the device 26 onto the top surface 29 of the expanding foam while the foam 30 is still tacky and before it has risen to its fully expanded height. In a typical panel depositing sequence, a panel segment 28 measuring approximately 2 feet by 4 feet, for example, is fed to the panel depositing device 26 in any suitable manner such as by individual manual placement onto the panel feed guide 48 intermediate the guide flanges 49. The panel 28 is then slid under the frame 34 and drawn against the rollers 36 and 38 by a pressure differential established by the axial fan 33. The panel segment 28 is in this manner suspended approximately one-half inch over the expanding foam surface 29 for movement by the friction rollers 38 onto the foam. If desired, guide flanges (not shown) or other suitable guiding device for controlling lateral movement of the panel 28 can be associated with the frame 34.

The friction rollers 38 are arranged to move at a linear speed in excess of the speed of movement of the conveyor press 14. Thus, if the conveyor press 14 is set for a speed of 15 feet per minute, the friction rollers 38 can be set to move at a linear speed of about 22 to about 24 feet per minute to drive the suspended panel segment 28 onto the foam 30 in the direction of the arrow 24. The suspended panel segment 28 is thus driven by the friction rollers 38 against an immediately preceding panel 28 which is adhered to the top surface 29 of the expanding foam.

The suction force of the fan 33 and the difference between the speed of the conveyor press 14 and the speed of the friction rollers 38 are predetermined so as to preclude the possibility that the entry force of the suspended panel segment 28 against the immediately preceding panel 28 will overcome the adhesive bond between the foam 30 and the preceding panel 28. Therefore, movement of the suspended panel 28 onto the expanding foam 30 after it has engaged the immediately preceding panel 28 does not exceed the speed of the conveyor press 14. Consequently, the friction rollers 38 which have a linear speed in excess of the conveyor press 14 tend to slip on the suspended panel 28, thereby establishing a back pressure between the suspended panel and the immediately preceding panel preventing the formation of gaps between panels.

Due to the inclination of the frame 34 toward the flexible sheet 16 a leading end 54 of the suspended panel segment 28 is impelled against a trailing end 56 of an immediately proceding panel segment 28 before any portion of the suspended panel 28 contacts the foam 30, as most clearly shown in FIG. 2. Thus there is minimal likelihood that any of the expanding foam 30 will be pinched between the consecutive panel segments.

Contact between the suspended panel 28 and the top surface 29 of the expanding foam occurs just prior to movement of the panel 28 into the conveyor press 14 which flattens the panels 28 against the foam 30. The conveyor press 14 forms the resultant laminate and acts as a curing zone in which the urethane foam 30 completes its expansion reaction to form a bond with both the flexible sheet 16 and the panel segments 28.

The laminate 52 on emerging from the conveyor press 14 is transported to the cutting device 50 where it is cross cut into predetermined lengths. Opposite side cutters (not shown) trim the laminate 52 to a predetermined width. Prior to the cutting and trimming operations the laminate 52 is provided with uniformly distributed perforations 58 in the flexible sheet 16 by a conventional perforating device (not shown). The perforations 58 provide the laminate 52 with better bonding adhesion during installation and provide an escape path for any released gases at the time of installation.

As will be apparent to those skilled in the art, the flexible sheet 16 can be formed of materials other than asphalt saturated felt, such as for example glass fiber reinforced aluminum foil, plain aluminum foil and polyethylene coated kraft paper. Other types of panel segments 28 known in the art can also be used such as fiberglass board, mineral wool board and wood fiber board. It will be further apparent that the urethane foam formulation can be altered when a different core thickness is desired for the laminate 52. In the panel depositing device 26 the friction rollers 38 can be functionally replaced by a friction belt of any suitable known configuration. The one-fourth inch dependency of the rollers as previously disclosed can be varied depending upon the suction produced by the fan. Such variables can be empirically or analytically determined. The fan suction and the relative speed differences between the conveyor 12 and the rollers 38 in the panel depositing device can also be varied as desired depending upon the thickness of the panel segments, the tackiness of the foam and the back pressure needed between consecutive panel segments 28 to avoid formation of any gaps therebetween.

Some advantages of the present invention evident from the foregoing description include an apparatus having means for impelling a leading end of one panel segment against a trailing end of an immediately preceding panel segment prior to depositing said one panel segment onto a layer of expanding foam. Another advantage is an apparatus that deposits a relatively inflexible panel segment onto an expanding foam surface to render any imperfections in the foam surface unapparent in the resultant laminate. A further advantage is a process for manufacturing insulation board that provides a laminate having a foam core of substantially uniform cell structure. Still another advantage is the use of a continuous flexible sheet on the conveyor serving as a base for the foam. Since the foam cannot leak through the sheet, there is no need to use a protective paper on the conveyor and no danger of the conveyor contamination previously described.

In view of the above it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. An apparatus for making a laminate having a foam core sandwiched between a layer of relatively thin flexible material and a layer of relatively thick inflexible material comprising means for moving an elongated sheet of said flexible material from a first station to a second station, dispensing means intermediate said first and second stations for dispensing foam forming urethane chemicals in layer form on said flexible sheet as it moves toward said second station, said foam forming chemicals expanding and adhering to said flexible sheet during movement toward said second station, and depositing means for moving individual undeposited segments of said inflexible material having opposite leading and trailing ends, in a first direction toward said second station and consecutively depositing said individual undeposited segments in side-by-side abutting relationship onto the expanding foam as said foam and said flexible sheet move toward said second station such that the leading edge of a deposited segment abuts against the trailing edge of an adjacent deposited segment, said depositing means including means for impelling the leading end of an undeposited segment against the trailing end of an immediately preceding segment to avoid the formation of gaps therebetween as the undeposited segment moves in said first direction for disposition onto the expanding foam.

2. The apparatus as claimed in claim 1 wherein said depositing means further include means for suspending the trailing end of the undeposited segment over the foam forming materials while the leading end of the undeposited segment is impelled against the trailing end of the immediately preceding segment and prior to disposition of the undeposited segment onto the foam layer.

3. The apparatus as claimed in claim 2 wherein said suspension means include means establishing a pressure differential between an upper and lower surface of the undeposited segment while it is being impelled against the immediately preceding segment.

4. The apparatus as claimed in claim 1 wherein said impelling means includes means for inclining the undeposited segment toward said expanding foam that the trailing end of the undeposited segment is suspended over the expanding foam while the leading end of the undeposited segment is impelled against the trailing end of the immediately preceding segment.

5. The apparatus as claimed in claim 4 wherein said inclining means include means for establishing a pressure differential between an upper and lower surface of the undeposited segment while it is being impelled against the immediately preceding segment.

6. An apparatus for making a laminate having a foam core sandwiched between a layer of relatively thin flexible material and a layer of relatively thick inflexible material comprising means for moving an elongated sheet of said flexible material from a first station to a second station, dispensing means intermediate said first and second stations for dispensing foam forming urethane chemicals in layer form on said flexible sheet as it moves towards said second station, said foam forming chemicals expanding and adhering to said flexible sheet during movement towards said second station and means for consecutively depositing individual segments of said inflexible material, having opposite leading and trailing ends, onto the expanding foam as said foam and said flexible sheet move toward said second station, said depositing means including means for impelling the leading end of an undeposited segment against the trailing end of an immediately preceding segment to avoid the formation of gaps between the succesive segments as the undeposited segment is disposed onto the expanding foam, and wherein said depositing means further include means for suspending the trailing end of the undeposited segment over the foam forming materials while the leading end of the undeposited segment is impelled against the trailing end of the immediately preceding segment and prior to disposition of the undeposited segment onto the foam layer.

7. The apparatus as claimed in claim 6 wherein said suspension means include means for establishing a pressure differential between an upper and lower surface of the undeposited segment while it is being impelled against the immediately preceding segment.

8. The apparatus as claimed in claim 1 wherein said impelling means include a movable friction surface engageable with a surface of the undeposited segment for frictionally driving said segment against the trailing end of the immediately preceding segment.

9. The apparatus as claimed in claim 8 further including drive means and wherein said movable friction surface comprises rollers drivingly connected to said drive means for movement at a linear speed in excess of the linear speed of said elongated sheet.

10. The apparatus as claimed in claim 1 further including means for pressing the undeposited segment against the foam after it has been disposed thereon by said depositing means.

11. An apparatus for making a laminate having a foam core sandwiched between a layer of relatively thin flexible material and a layer of relatively thick inflexible material comprising means for moving an elongated sheet of said flexible material from a first station to a second station, dispensing means intermediate said first and second stations for dispensing foam forming urethane chemicals in layer foam on said flexible sheet as it moves towards said second station, said foam forming chemicals expanding and adhering to said flexible sheet during movement toward said second station and means for consecutively depositing individual segments of said inflexible material, having opposite leading and trailing ends, onto the expanding foam as said foam and said flexible sheet move toward said second station, said depositing means including means for impelling the leading end of an undeposited segment against the trailing end of an immediately preceding segment to avoid the formation of gaps between the successive segments as the undeposited segment is disposed onto the expanding foam, and wherein said impelling means include means for inclining the undeposited segment toward said expanding foam such that the trailing end of the undeposited segment is suspended over the expanding foam while the leading end of the undeposited segment is impelled against the trailing end of the immediately preceding segment.

12. The apparatus as claimed in claim 11 wherein said inclining means include means for establishing a pressure differential between an upper and lower surface of the undeposited segment while it is being impelled against the immediately preceding segment.

13. A method of making a laminate comprising supporting and conveying a sheet of flexible elongated material between two points, dispensing foam forming urethane chemicals at a predetermined rate onto the moving flexible material, and consecutively depositing a plurality of individual segments of relatively inflexible material, having leading and trailing ends, in continuous succession onto the upper surface of the foam while the upper foam surface is tacky, said deposition including impelling the leading end of each undeposited segment against the trailing end of an immediately preceding segment to avoid the formation of gaps between successive segments as each undeposited segment is successively disposed onto the foam forming materials, and wherein the trailing edge of an undeposited segment of inflexible material is suspended over the upper surface of the foam while the leading edge of the undeposited segment is being impelled against the trailing edge of the immediately preceding segment.

14. The method of claim 6 wherein the trailing edge of the undeposited segment is suspended over the upper surface of the foam by establishing a pressure differential between the upper and lower surfaces of the undeposited segment.

15. A method of making a laminate comprising supporting and conveying a sheet of flexible elongated material from one station to another station, dispensing foam forming urethane chemicals at a predetermined rate onto the moving flexible material, moving a plurality of individual undeposited segments of relatively inflexible material, having leading and trailing ends, toward said second station, and consecutively depositing said undeposited segments in continuous succession onto the upper surface of the foam while the upper foam surface is tacky to provide a side-by-side abutting relationship between leading and trailing ends of adjacent deposited segments, said deposition including impelling the leading edge of each undeposited segment against the trailing end of an immediately preceding segment to avoid the formation of gaps between successive segments as each undeposited segment is successively disposed onto the foam forming materials.

16. The method of claim 15 wherein the sheet of flexible elongated material is moved at a predetermined speed and an undeposited inflexible segment is impelled against a deposited inflexible segment by moving the undeposited segment against the deposited segment at a linear speed in excess of the linear speed of the flexible elongated material.

17. The method of claim 15 wherein the trailing edge of an undeposited segment of inflexible material is suspended over the upper surface of the foam while the leading edge of the undeposited segment is being impelled against the trailing edge of the immediately preceding segment.

18. The method of claim 17 wherein the trailing edge of the undeposited segment is suspended over the upper surface of the foam by establishing a pressure differential between the upper and lower surfaces of the undeposited segment.

19. The method of claim 15 wherein the individual segments of undeposited inflexible material are deposited onto the upper surface of the foam before the foam has risen to its fully expanded height.

* * * * *

UNITED STATES PATENT AND TRADEMARK OFFICE
CERTIFICATE OF CORRECTION

PATENT NO. : 4,019,938
DATED : April 26, 1977
INVENTOR(S) : HARRY FORRESTER

It is certified that error appears in the above-identified patent and that said Letters Patent are hereby corrected as shown below:

Column 1, line 45, change "flexible" to --inflexible--.

Column 4, line 23, change "178" to --one-half--.

Claim 4, column 7, line 24, change "including" to --inclining--.

Signed and Sealed this nineteenth Day of July 1977

[SEAL]

Attest:

RUTH C. MASON
Attesting Officer

C. MARSHALL DANN
Commissioner of Patents and Trademarks